(12) United States Patent
Hobbs

(10) Patent No.: US 8,074,904 B1
(45) Date of Patent: *Dec. 13, 2011

(54) BROADCAST SPREADER WITH A DIRECTIONAL CONTROL ASSEMBLY

(75) Inventor: Patrick Hobbs, Louisville, KY (US)

(73) Assignee: Brinly-Hardy Company, Jeffersonville, IN (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/209,755

(22) Filed: Sep. 12, 2008

(51) Int. Cl.
*A01C 7/02* (2006.01)
*A01C 17/00* (2006.01)

(52) U.S. Cl. ......... 239/652; 239/665; 239/668; 239/687

(58) Field of Classification Search ........... 239/650–689
See application file for complete search history.

(56) References Cited

U.S. PATENT DOCUMENTS

| | | | |
|---|---|---|---|
| 783,387 A * | 2/1905 | Roby et al. ............... | 239/656 |
| 1,919,619 A * | 7/1933 | Dean ....................... | 239/687 |
| 3,383,055 A | 5/1968 | Speicher | |
| 3,682,395 A | 8/1972 | Van Der Lely et al. | |
| 3,738,546 A * | 6/1973 | Speicher .................. | 222/561 |
| 3,817,408 A | 6/1974 | Hanson | |
| 4,106,703 A | 8/1978 | Magda | |
| 4,166,581 A | 9/1979 | Hetrick | |
| 4,401,266 A | 8/1983 | Funkhouser | |
| 4,469,210 A | 9/1984 | Blumer et al. | |
| 4,548,362 A | 10/1985 | Doering | |
| 4,588,133 A | 5/1986 | Brabb et al. | |
| 4,681,265 A * | 7/1987 | Brabb et al. ............. | 239/665 |
| 4,867,381 A * | 9/1989 | Speicher .................. | 239/665 |
| 4,991,781 A | 2/1991 | Barbieri | |
| 5,145,116 A * | 9/1992 | Shaver .................... | 239/665 |
| 5,294,060 A * | 3/1994 | Thompson ............... | 239/656 |
| 5,340,033 A | 8/1994 | Whitell | |
| 5,370,321 A | 12/1994 | Bianco | |
| 5,501,405 A * | 3/1996 | Doornek .................. | 239/683 |
| 6,047,909 A * | 4/2000 | Simpson .................. | 239/687 |
| 6,209,808 B1 | 4/2001 | Anderson | |
| 6,499,679 B1 | 12/2002 | Woodruff et al. | |
| 6,616,074 B2 | 9/2003 | Courtney et al. | |
| 7,063,280 B1 | 6/2006 | Bogart et al. | |
| 2002/0014545 A1 | 2/2002 | Woodruff et al. | |
| 2003/0192968 A1 | 10/2003 | Courtney et al. | |
| 2008/0078850 A1* | 4/2008 | Bowsher .................. | 239/687 |

FOREIGN PATENT DOCUMENTS

WO 02087310 11/2002

* cited by examiner

*Primary Examiner* — Len Tran
*Assistant Examiner* — James Hogan
(74) *Attorney, Agent, or Firm* — Stites & Harbison, PLLC; David W. Nagle, Jr.

(57) ABSTRACT

A broadcast spreader includes a directional control assembly that defines a pathway for granular material from a hopper through a discharge port and onto a rotating fan. The directional control assembly includes a first plate that is secured to and adapted for slidable movement with respect to the hopper. The first plate defines an opening therethrough that is substantially in registry with but smaller than the discharge port, thus serving to define a pathway for the granular material from the hopper through the discharge port and onto the fan. The directional control assembly further includes a second plate secured to and adapted for slidable movement with respect to the hopper and the first plate. Movement of the second plate relative to the first plate selectively opens or closes the pathway for the granular material from the hopper through the discharge port and onto the fan.

21 Claims, 9 Drawing Sheets

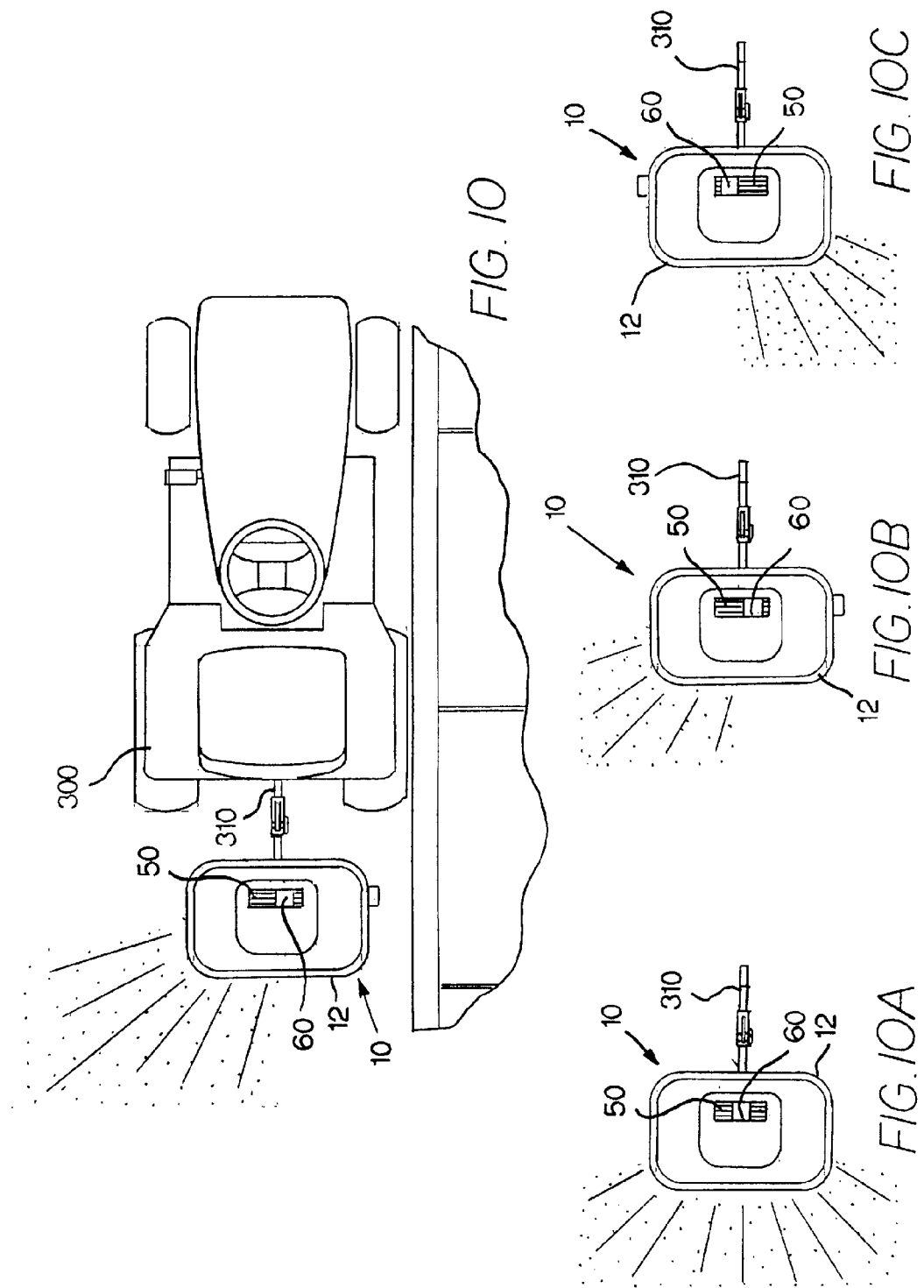

BROADCAST SPREADER WITH A DIRECTIONAL CONTROL ASSEMBLY

BACKGROUND OF THE INVENTION

The present invention relates to a broadcast spreader, and, more particularly, to a broadcast spreader with a directional control assembly.

A broadcast spreader (which may also be referred to as a rotary spreader or a spin spreader) is commonly used to distribute granular materials, such as seed, fertilizers, pelletized lime, insecticides, salts, ice melts, and/or mulch to a lawn, field, pasture, paved surface, or other outdoor surface. A broadcast spreader is generally comprised of a hopper mounted on wheels with a means for attaching the broadcast spreader to a tractor, truck, riding mower, or other vehicle. Alternatively, the hopper may be mounted to a vehicle (such as an all-terrain vehicle) or another engine-driven platform, or the hopper may be mounted on wheels but provided with a handle so that it can be manually pushed. Whether towed behind a vehicle, mounted to a vehicle, or pushed, the broadcast spreader distributes granular materials to a lawn, field, pasture, paved surface, or other outdoor surface.

In any event, the hopper has a discharge port (or opening) in a lower portion thereof, with the granular material passing through this discharge port under the force of gravity, where the material is then distributed onto a rotating fan which propels the material onto lawn, field, pasture, paved surface, or other outdoor surface. The flow of material, i.e., the amount distributed onto the rotating fan, is commonly controlled by a shutter (or gate). The shutter can be selectively positioned relative to the discharge port to regulate the flow of material. In any event, such a construction for a broadcast spreader is well-known and understood by one of ordinary skill in the art. For example, U.S. Patent Publication No. 2002/0162907, which is incorporated herein by reference, provides a detailed list of prior art references that describe the construction of a common broadcast spreader.

However, it is recognized that different types of material and/or different speeds of travel have the undesirable effect of skewing the direction and distance the material is thrown to one side or the other, or causing a greater or lesser amount of granular material to be thrown in a certain direction. For example, at the same speed of travel, a heavy fertilizer will spread differently than a light grass seed.

Accordingly, in commonly assigned U.S. Pat. No. 7,063,280 (which is incorporated herein by reference), a broadcast spreader is described that includes a directional control assembly, allowing the operator to adjust the direction of the distribution pattern, but without adversely affecting the distribution pattern. Specifically, in one exemplary embodiment, the directional control assembly includes an upper plate that is secured to the underside of the hopper of the broadcast spreader, an intermediate (or rotating) plate that is secured to and adapted for rotation with respect to the upper plate, and a lower (or shutter) plate that is secured to and adapted for slidable movement with respect to the intermediate plate.

An arc-shaped opening is defined through the upper plate and is substantially in registry with the discharge port defined through the hopper when the directional control assembly is assembled and secured to the hopper. There is also an arc-shaped opening defined through the intermediate plate which is substantially in registry with the opening defined through the upper plate; however, this opening is an approximately 90° arc, as compared to the 180° arc of the opening defined through the upper plate.

When assembled, the intermediate plate is positioned adjacent the bottom surface of the upper plate and adapted for rotation with respect to the upper plate. Furthermore, the lower plate is secured to the bottom surface of the intermediate plate for slidable movement with respect to the intermediate plate. In this position, the lower plate rotates with the intermediate plate. However, this lower plate can also be independently advanced forwardly and rearwardly to act as a shutter, opening and closing the pathway from the discharge port of the hopper to the rotating fan, and thus regulating the flow of material.

In any event, as the intermediate plate (and lower plate) is rotated relative to the upper plate and the hopper, granular material continues to contact the same annular "band" on the rotating fan, but the annular band is shifted from side to side, i.e., it is rotated clockwise or counterclockwise. Accordingly, the direction of the distribution pattern can be altered without changing the rate of flow of material from the hopper or otherwise adversely affecting the distribution pattern. By allowing for such directional control, an operator can make adjustments to account for the speed of the tractor, the size and weight of the granular materials, and/or other factors that may affect the distribution pattern.

However, Applicants have recognized that such a construction may not be optimal for all uses and applications, and that there remains a need for a broadcast spreader that includes a directional control, allowing the operator to adjust the direction of the distribution pattern and ensure a consistent and even distribution pattern.

SUMMARY OF THE INVENTION

The present invention is a broadcast spreader with a directional control assembly.

In one exemplary embodiment, the broadcast spreader includes a hopper that is mounted on a support frame. An axle extends through a lower portion of this support frame, with wheels being mounted on either end of the axle. The support frame is connected to a tow bar, linking the broadcast spreader to a tractor, truck, riding mower, or other vehicle.

Like most broadcast spreaders, this exemplary broadcast spreader includes a discharge port (or opening) defined through a bottom surface of the hopper, with the granular material stored in the hopper passing through this discharge port under the force of gravity and then being distributed onto a rotating fan which propels the material onto a lawn, field, pasture, paved surface, or other outdoor surface.

A directional control assembly is secured to the underside of the hopper of the broadcast spreader and is in registry with the discharge port. In one exemplary embodiment, the directional control assembly includes a first (or upper) plate that is secured to and adapted for sliding movement relative to the underside of the hopper; a second (or lower) plate that is secured to and adapted for sliding movement with respect to the first plate, and a pair of braces that complete the directional control assembly.

The first plate defines first and second longitudinal slots along one edge, and further defines third and fourth longitudinal slots along an opposite edge. Furthermore, the first plate defines a central opening, which is in registry with (but smaller than) the discharge port defined through the hopper when the directional control assembly is assembled and secured to the hopper.

The second plate defines a first longitudinal slot along one edge and a second longitudinal slot along an opposite edge. However, the longitudinal slots defined by the second plate are oriented substantially perpendicular to the longitudinal slots defined by the first plate. Furthermore, the second plate may be characterized as having a generally C-shape (with upper and lower legs connected by a web portion), defining a rear opening having a length and width similar to that of the discharge opening defined through the bottom surface of the hopper.

The braces are substantially identical to one another. Each brace includes a substantially flat base member with a boss extending upwardly from the base member at each distal end. Each of these bosses defines a central channel, allowing a bolt or similar fastener to pass through a respective boss. Bolts are then passed through the hopper, and then through each of the first plate, the second plate, and the bosses of the respective braces, before being secured by corresponding nuts. When the respective nuts are tightened, the bosses are drawn into and received in the respective slots. As a result of this construction, the bosses of the respective braces allow for movement of the first plate relative to the braces and the hopper, but limit this movement to a single direction. Accordingly, a user can grasp and manipulate the first plate from side to side. At the same time, the bosses of the respective braces allow for movement of the second plate relative to the braces and the hopper, but in a different direction. If the movement of the first and second plates were characterized in the terms of x and y coordinates, the first plate moves along the x-axis, while the second plate moves along the y-axis.

Thus, the second plate serves as a shutter to open or close the pathway for the granular material from the hopper through the discharge port and onto the rotating fan. In other words, the sliding movement of the second plate with respect to the hopper and the first plate allows the user to select the flow rate of the granular material by setting the second plate (i.e., the position of the rear opening defined by the second plate relative to the discharge port) in a closed position, a fully open position, or a position therebetween. Then, movement of the first plate relative to the hopper causes a shifting of the pathway for the granular material, thus altering the direction of the distribution pattern. Thus, in operation, the construction of the directional control assembly not only provides for control of the flow of material to the rotating fan (on/off), but also allows for the shifting of the distribution pattern from side to side and ensures a consistent and even distribution pattern.

DESCRIPTION OF THE DRAWINGS

FIG. 10 illustrates the exemplary broadcast spreader of FIG. 1 in operation; and FIGS. 10A-10C are schematic views looking into the hopper of the exemplary broadcast spreader of FIG. 1, and illustrating various positions of the directional control assembly to alter the direction of the distribution pattern.

DETAILED DESCRIPTION OF THE INVENTION

The present invention is a broadcast spreader with a directional control assembly.

Figure 1:
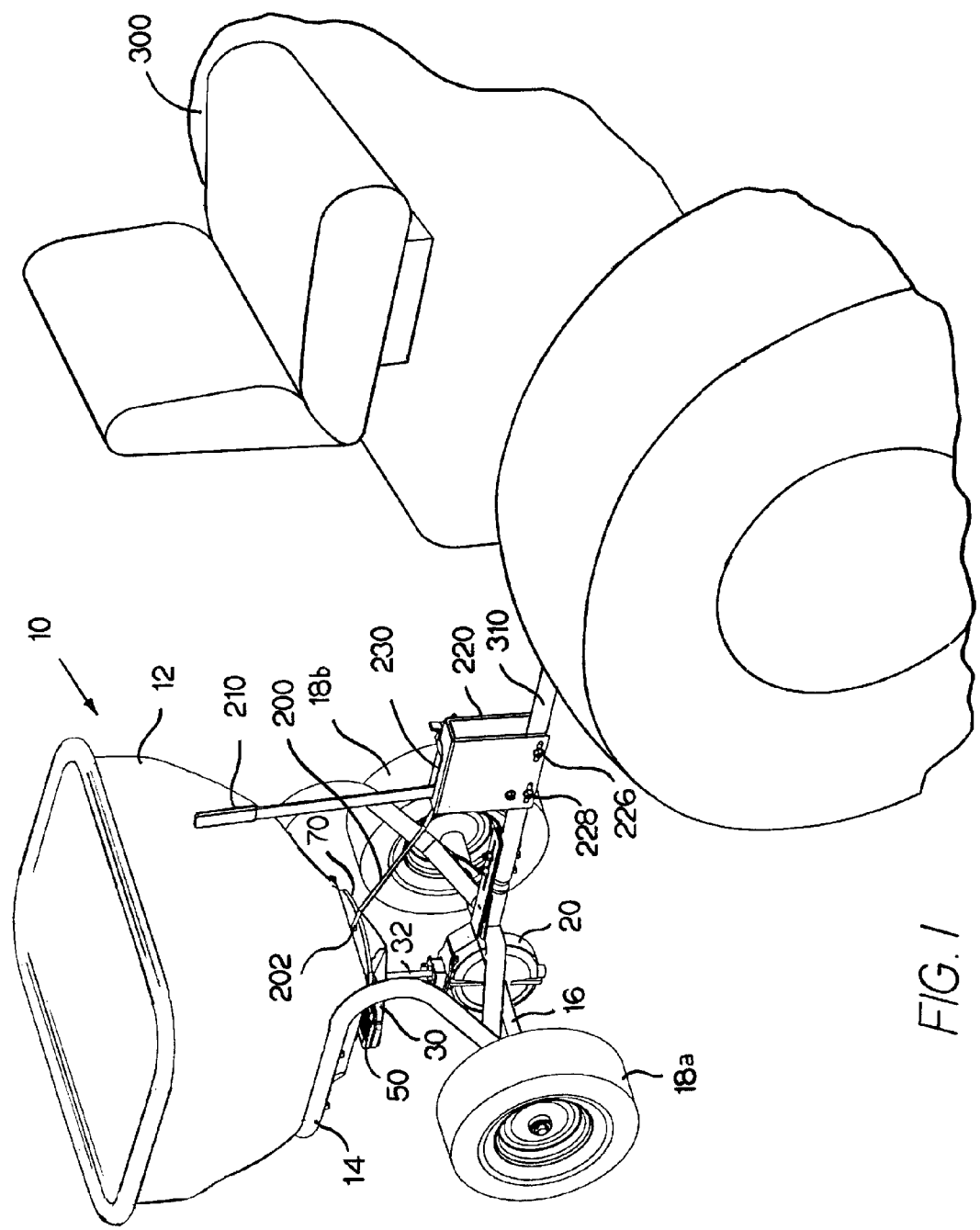
FIG. 1 is a perspective view of an exemplary broadcast spreader made in accordance with the present invention secured to and being towed behind a tractor.

FIG. 1 is a perspective view of an exemplary broadcast spreader 10 made in accordance with the present invention secured to and being towed behind a tractor 300. The broadcast spreader 10 generally includes a hopper 12 that is mounted on a support frame 14. An axle 16 extends through a lower portion of this support frame 14, with wheels 18a, 18b being mounted on either end of the axle 16. The support frame 14 is connected to a tow bar 310, linking the broadcast spreader 10 to the tractor 300.

As mentioned above, in alternate embodiments, the hopper may be mounted to a vehicle (such as an all-terrain vehicle) or another engine-driven platform, or the hopper may be mounted on wheels but provided with a handle so that it can be manually pushed.

Figure 2:
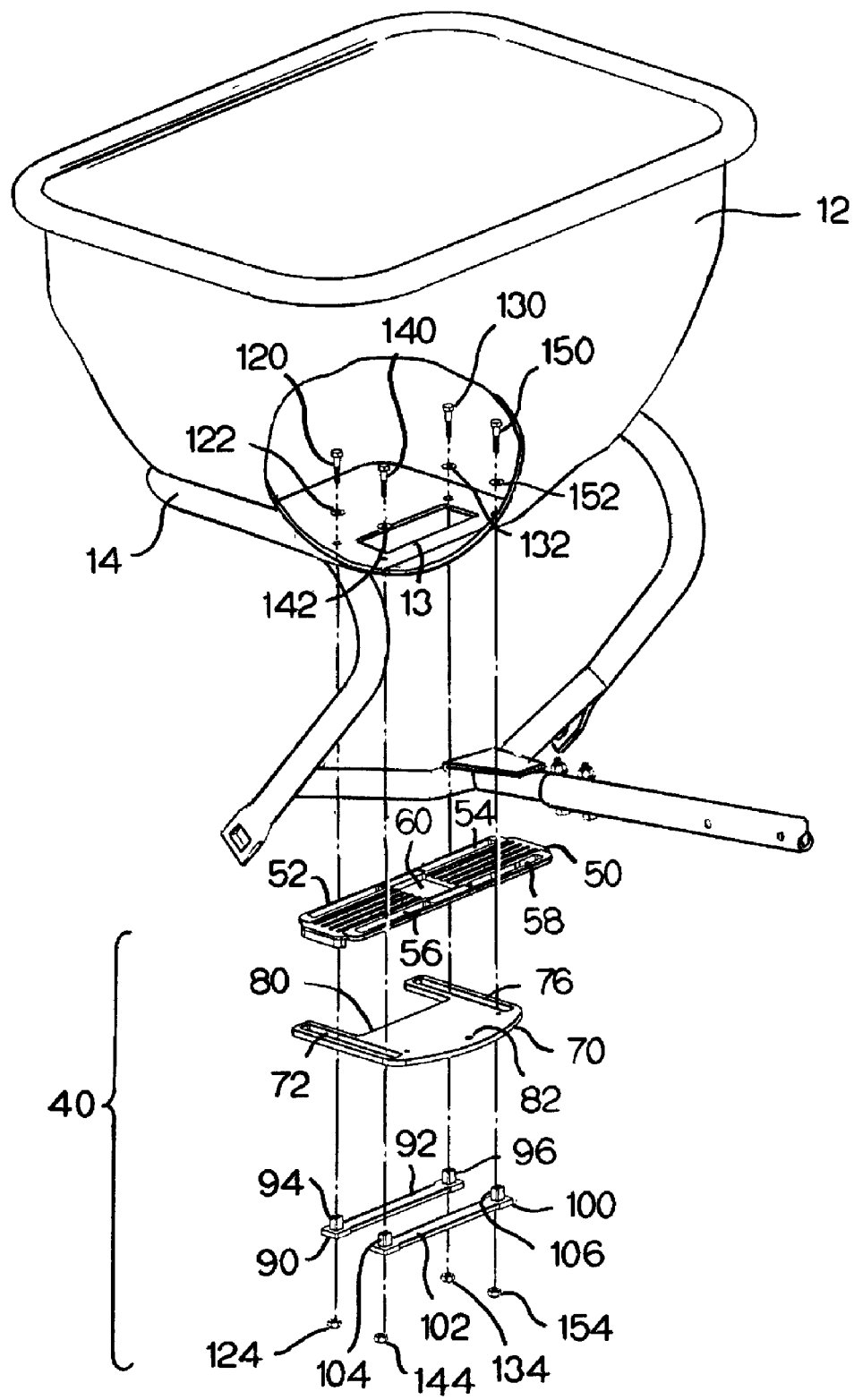
FIG. 2 is an exploded perspective view of the directional control assembly of the exemplary broadcast spreader of FIG. 1.

Referring again to FIG. 1 and the exploded perspective view of FIG. 2, like most broadcast spreaders, the exemplary broadcast spreader 10 includes a discharge port (or opening) 13 (as best shown in FIG. 2) defined through a bottom surface of the hopper 12, with the granular material stored in the hopper 12 passing through this discharge port 13 under the force of gravity and then being distributed onto a rotating fan 30 which propels the material onto a lawn, field, pasture, paved surface, or other outdoor surface. With respect to the term "granular material," this term is intended to be a generic descriptor of the types of materials that can be distributed using a broadcast spreader, and the term "granular material" includes, but is not limited to, seed, fertilizers, pelletized lime, insecticides, salts, ice melts, and/or mulch. In this exemplary embodiment, the broadcast spreader 10 utilizes the movement of the wheels 18a, 18b to drive the rotating fan 30. Specifically, rotation of the fan 30 is achieved through use of a transmission 20 that couples the axle 16 of the wheels 18a, 18b of the broadcast spreader 10 to a shaft 32 that drives the fan 30. Of course, for broadcast spreaders that are mounted to a vehicle or another engine-driven platform, such as an all-terrain vehicle, since there are no wheels to drive the fan, a motor is often used to drive the fan.

With respect to the discharge port 13, it should be recognized that the discharge port 13 could be comprised of multiple discrete openings defined through the bottom surface of the hopper 12 without departing from the spirit and scope of the present invention.

In any event, and as mentioned above, the focus of the present invention is on a directional control assembly, allowing the operator to shift the distribution pattern from side to side. Referring now to FIGS. 2-5, the directional control assembly 40 is secured to the underside of the hopper 12 of the broadcast spreader 10 and is in registry with the discharge port 13. As shown, in this exemplary embodiment, the directional control assembly 40 includes a first (or upper) plate 50 that is secured to and adapted for sliding movement relative to the underside of the hopper 12; a second (or lower) plate 70 that is secured to and adapted for sliding movement with respect to the first plate 50, and a pair of braces 90, 100 that complete the directional control assembly 40, as further described below.

Figure 3:
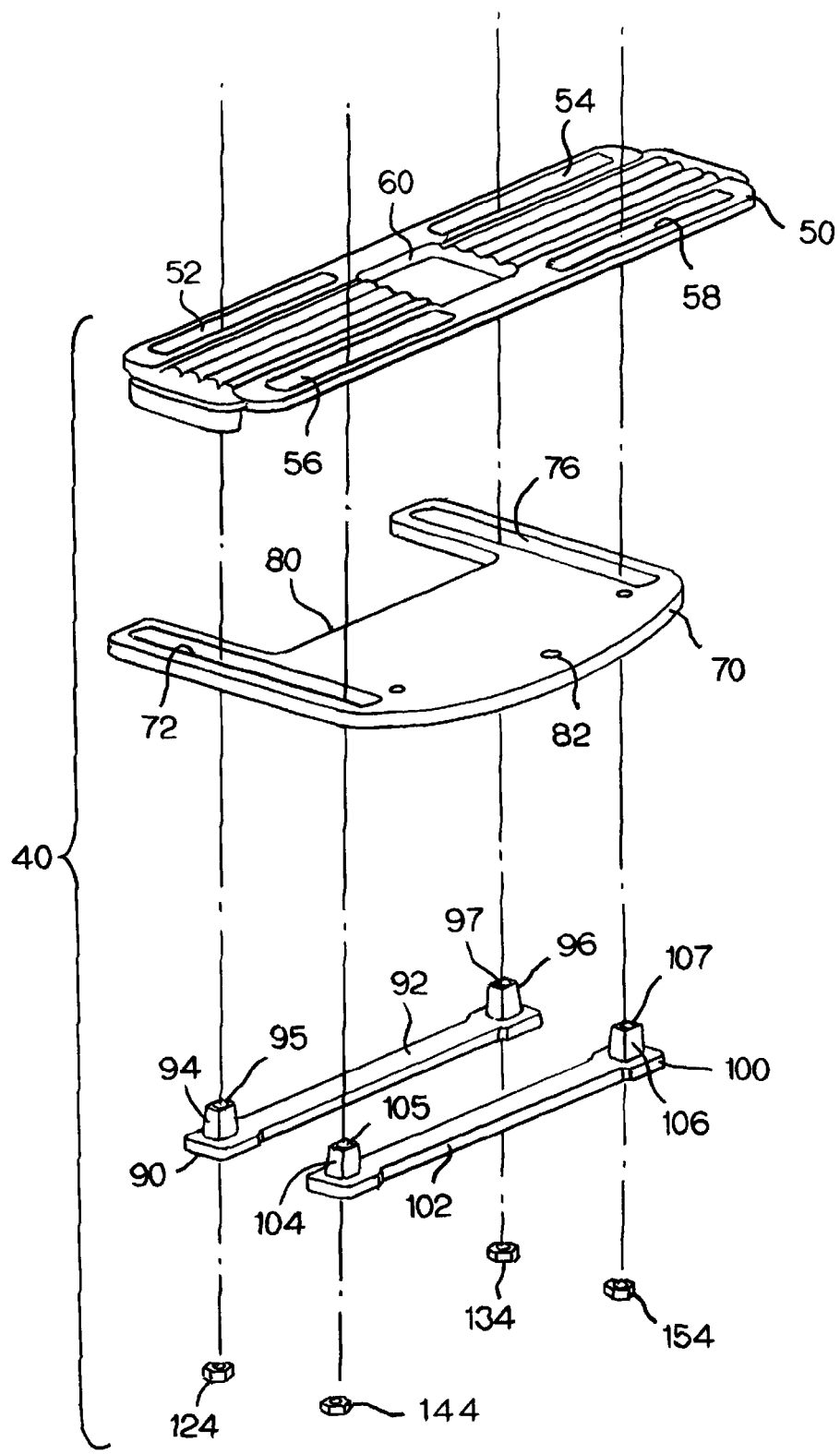
FIG. 3 is an enlarged perspective view of the first plate, the second plate, and the pair of braces of the directional control assembly of the exemplary broadcast spreader of FIG. 1.
Figure 4:
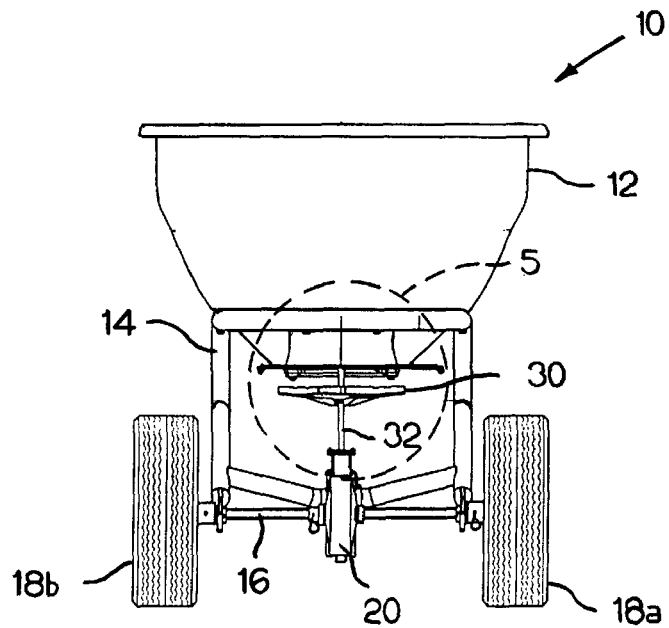
FIG. 4 is a rear view of the exemplary broadcast spreader of FIG. 1.
Figure 5:
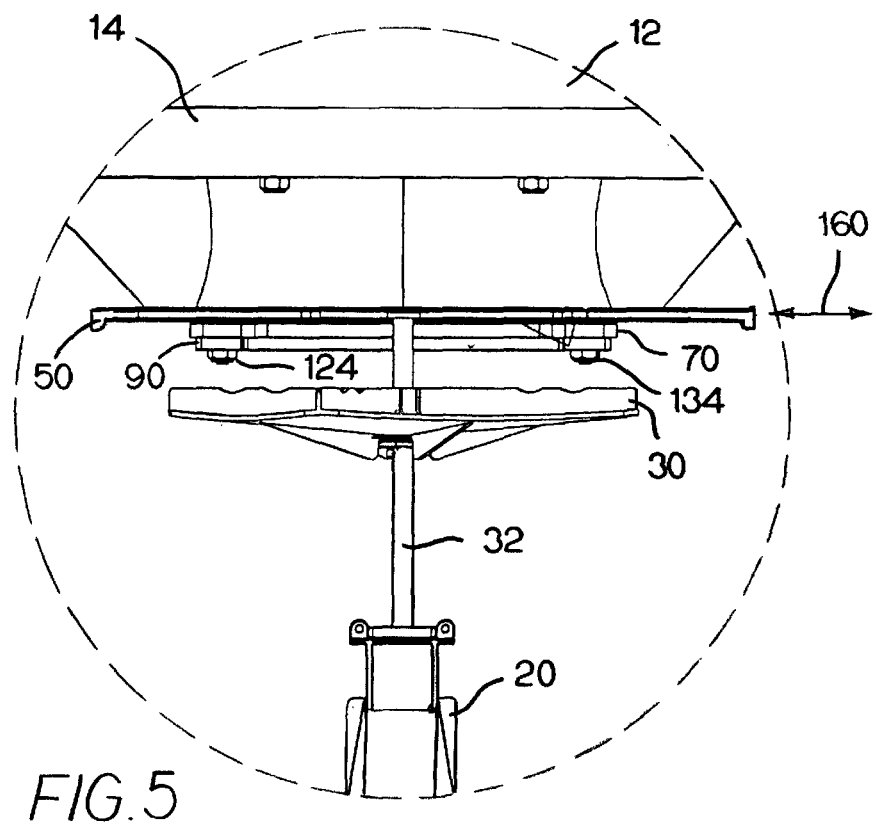
FIG. 5 is an enlarged, partial rear view of the exemplary broadcast spreader of FIG. 1.

Referring now to FIG. 3, the first plate 50 defines first and second longitudinal slots 52, 54 along one edge, and further defines third and fourth longitudinal slots 56, 58 along an opposite edge. Furthermore, the first plate 50 defines a central opening 60, which is in registry with (but smaller than) the discharge port 13 defined through the hopper 12 when the directional control assembly 40 is assembled and secured to the hopper 12 (as best shown in FIGS. 4 and 5).

Referring still to FIG. 3, the second plate 70 defines a first longitudinal slot 72 along one edge and a second longitudinal slot 76 along an opposite edge. However, and as shown in FIG. 3, the longitudinal slots 72, 76 defined by the second plate 70 are oriented substantially perpendicular to the longitudinal slots 52, 54, 56, 58 defined by the first plate 50. Furthermore, the second plate 70 may be characterized as having a generally C-shape (with upper and lower legs connected by a web portion), defining a rear opening 80 having a length and width similar to that of the discharge opening 13 defined through the bottom surface of the hopper 12.

Referring still to FIG. 3, the braces 90, 100 are substantially identical to one another. Each brace 90, 100 includes a substantially flat base member 92, 102 and has a boss 94, 96, 104, 106 extending upwardly from the base member 92, 102 at each distal end. Each of these bosses 94, 96, 104, 106 defines a central channel 95, 97, 105, 107, allowing a bolt or similar fastener to pass through a respective boss 94, 96, 104, 106, the importance of which is described below.

In order to assemble the components of the directional control assembly 40 to the hopper 12, in this exemplary embodiment and perhaps as best shown in FIG. 2, a first bolt 120 is inserted through the open end of the hopper 12, passes through a first corresponding washer 122, through the hopper 12, and then through each of the first plate 50, the second plate 70, and one of the braces 90, before being secured by a nut 124. In this regard, this first bolt 120 passes through the longitudinal slot 52 defined by the first plate 50, through the longitudinal slot 72 defined by the second plate 70, and through the central channel 95 (as shown in FIG. 3) defined by the boss 94 of the brace 90. When the nut 124 is tightened, the boss 94 is drawn into and received in the respective slots 52, 72, the importance of which is described below.

Similarly, a second bolt 130 is inserted through the open end of the hopper 12, passes through a second corresponding washer 132, through the hopper 12, and then through each of the first plate 50, the second plate 70, and one of the braces 90, before being secured by a nut 134. In this regard, this second bolt 130 passes through the longitudinal slot 54 defined by the first plate 50, through the longitudinal slot 76 defined by the second plate 70, and through the central channel 97 (as shown in FIG. 3) defined by the boss 96 of the brace 90. When the nut 134 is tightened, the boss 96 is drawn into and received in the respective slots 54, 76.

Similarly, a third bolt 140 is inserted through the open end of the hopper 12, passes through a third corresponding washer 142, through the hopper 12, and then through each of the first plate 50, the second plate 70, and the second of the braces 100, before being secured by a nut 144. In this regard, this third bolt 140 passes through the longitudinal slot 56 defined by the first plate 50, through the longitudinal slot 72 defined by the second plate 70, and through the central channel 105 (as shown in FIG. 3) defined by the boss 104 of the brace 100. When the nut 144 is tightened, the boss 104 is drawn into and received in the respective slots 56, 72.

Lastly, a fourth bolt 150 is inserted through the open end of the hopper 12, passes through a fourth corresponding washer 152, through the hopper 12, and then through each of the first plate 50, the second plate 70, and the second of the braces 100, before being secured by a nut 154. In this regard, this fourth bolt 150 passes through the longitudinal slot 58 defined by the first plate 50, through the longitudinal slot 76 defined by the second plate 70, and through the central channel 107 (as shown in FIG. 3) defined by the boss 106 of the brace 100. When the nut 154 is tightened, the boss 106 is drawn into and received in the respective slots 58, 76.

FIGS. 4 and 5 are rear views of the broadcast spreader 10, as assembled, illustrating the components of the directional control assembly 40 secured to the hopper 12. Because of how the components of the directional control assembly 40 are assembled and secured to one another, the first plate 50 can be moved side to side as illustrated by arrow 160 in FIG. 5. Specifically, the bosses 94, 96, 104, 106 (as shown in FIGS. 2 and 3) of the respective braces 90, 100 allow for movement of the first plate 50 relative to the braces 90, 100 and the hopper 12, but limit this movement to a single direction, i.e., along an axis substantially perpendicular to the longitudinal axis defined by the tow bar 310. Accordingly, and as further described below, a user can grasp and manipulate the first plate 50 from side to side.

Also, because of how the components of the directional control assembly 40 are assembled and secured to one another, the second plate 70 can be moved forward and rearward. Specifically, the bosses 94, 96, 104, 106 of the respective braces 90, 100 allow for movement of the second plate 70 relative to the braces 90, 100 and the hopper 12, but in a different direction, i.e., along an axis substantially parallel to and aligned with the longitudinal axis defined by the tow bar 310. In other words, if the movement of the first and second plates 50, 70 were characterized in the terms of x and y coordinates, the first plate 50 moves along the x-axis, while the second plate 70 moves along the y-axis.

Figure 6:
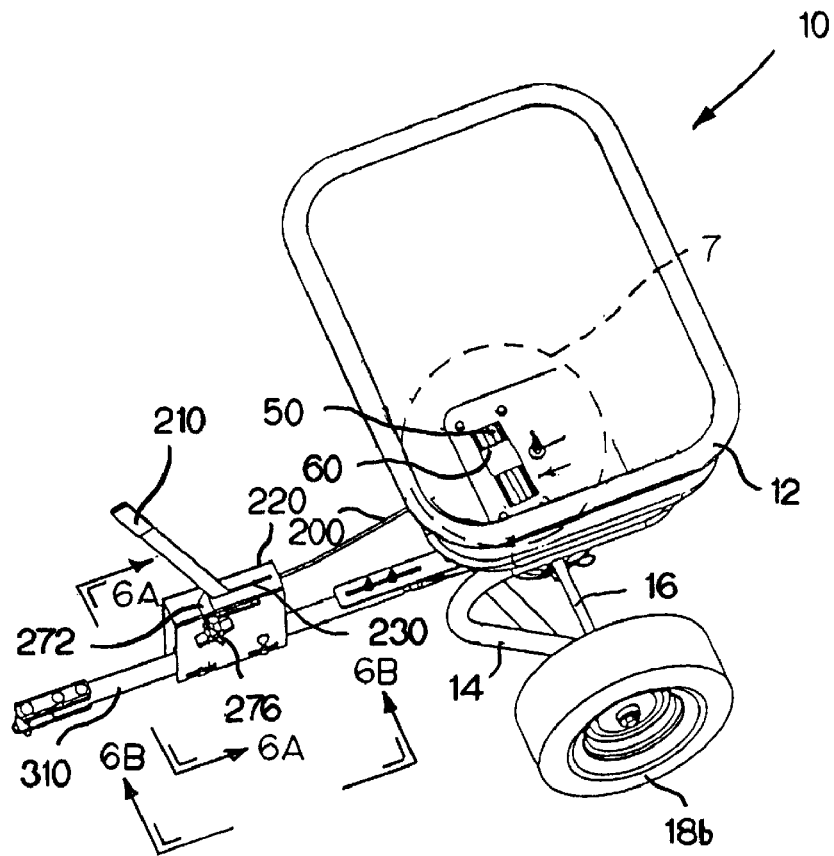
FIG. 6 is a top perspective view of the exemplary broadcast spreader of FIG. 1.
Figure 7:
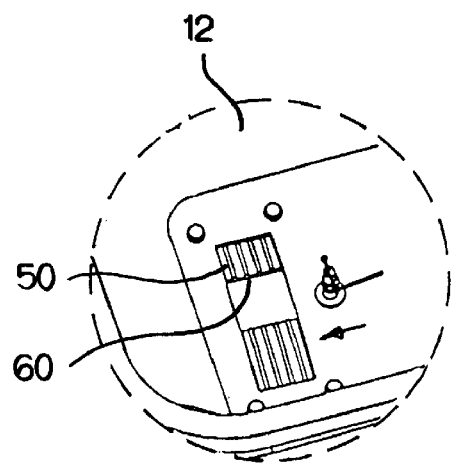
FIG. 7 is an enlarged, partial perspective view of the exemplary broadcast spreader of FIG. 1.
Figure 8:
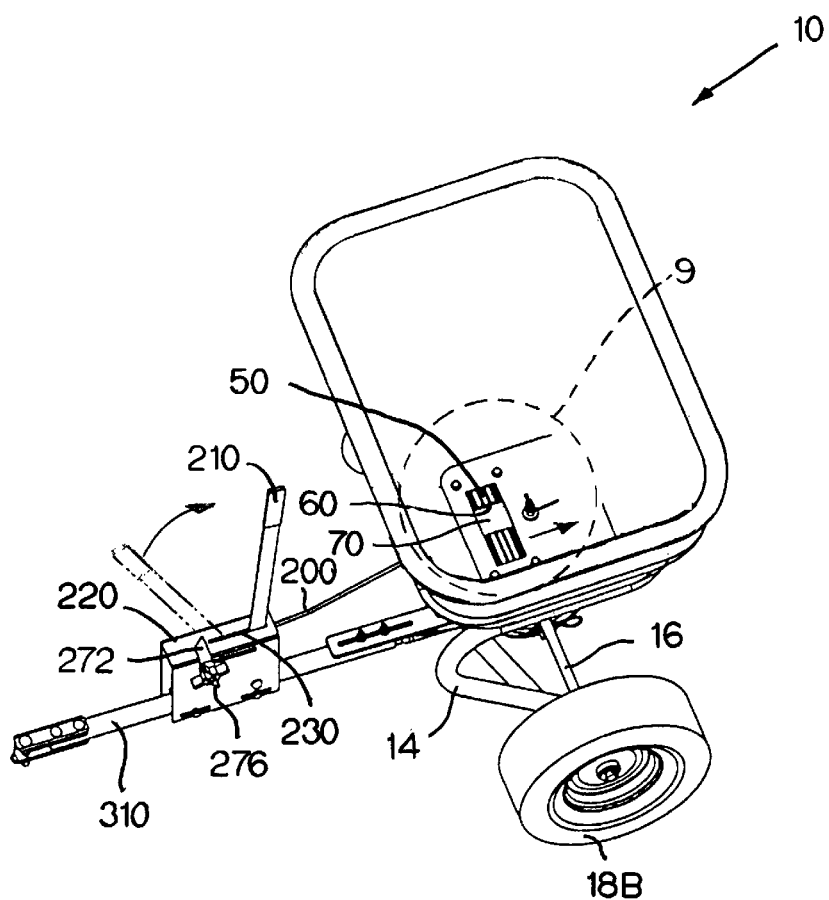
FIG. 8 is another top perspective view of the exemplary broadcast spreader of FIG. 1.
Figure 9:
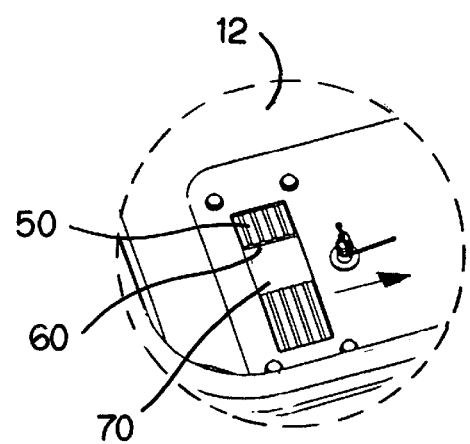
FIG. 9 is another enlarged, partial perspective view of the exemplary broadcast spreader of FIG. 1.

As a result of such construction of the directional control assembly 40, the second plate 70 serves as a shutter (or gate) to open or close the pathway for the granular material from the hopper 12 through the discharge port 13 and onto the rotating fan 30. In other words, the sliding movement of the second plate 70 with respect to the hopper 12 and the first plate 50 allows the user to select the flow rate of the granular material by setting the second plate 70 (i.e., the position of the rear opening 80 defined by the second plate 70 relative to the discharge port 13) in a closed position, a fully open position, or a position therebetween. In FIGS. 6 and 7, the second plate 70 is in the fully open position, in which the rear opening 80 defined by the second plate 70 is aligned and in registry with the discharge port 13. In FIGS. 8 and 9, the second plate 70 is in the closed position.

Then, movement of the first plate 50 relative to the hopper 12 causes a shifting of the pathway for the granular material, thus altering the direction of the distribution pattern. Thus, in operation, and as shown in FIGS. 10, 10A, 10B, and 10C, the construction of the directional control assembly 40 not only provides for control of the flow of granular material to the rotating fan 30 (on/off), but also allows for the shifting of the distribution pattern from side to side and ensures a consistent and even distribution pattern. In FIG. 10A, the second plate 70 is centered relative to the discharge port 13 defined by the hopper 12, and as a result, granular material is distributed onto the rotating fan 30 (as shown in FIGS. 1, 4, and 5) such that it is propelled in a distribution pattern that is centered behind the spreader 10. In FIG. 10B, the second plate 70 has been shifted to the right, and the granular material is distributed onto the rotating fan 30 (as shown in FIGS. 1, 4 and 5) such that it is propelled in a distribution pattern that is behind and to the left of the spreader 10. Lastly, in FIG. 10C, the second plate 70 has been shifted to the left, and the granular material is distributed onto the rotating fan 30 (as shown in FIGS. 1, 4 and 5) such that it is propelled in a distribution pattern that is behind and to the right of the spreader 10.

With respect to the sliding movement of the first and second plates 50, 70, as mentioned above, a user can readily grasp and manipulate the first plate 50 from side to side to adjust the direction of the distribution pattern. With respect to the movement of the second plate 70, in this exemplary embodiment, the second plate 70 defines a hole 82 near its front edge, as best shown in FIGS. 2 and 3. Thus, a hooked distal end 202 of a linking rod 200 can be inserted into and secured in this hole 82, as best shown in FIG. 1. Referring now to FIGS. 6, 6A, 6B, and 7, the opposite end 204 of this linking rod 200 is then secured to a control handle 210. In this exemplary embodiment, the opposite end 204 of the linking rod 200 is also hooked (i.e., has a generally S-shape) such that it can be inserted into and secured in a hole 212 defined by the control handle 210. Furthermore, in this exemplary embodiment, the control handle 210 is partially housed within an enclosure 220 that is secured to the tow bar 310, in this case, by a pair of bolts 222, 224 and corresponding nuts 226, 228. Furthermore, a bolt 250 passes through this enclosure 220 and the end of the control handle 210, and is then secured by a nut 252. This bolt 250 defines a pivot axis 260, such that the control handle 210 can be rotated forward or rearward about this pivot axis 260.

Figure 6A:
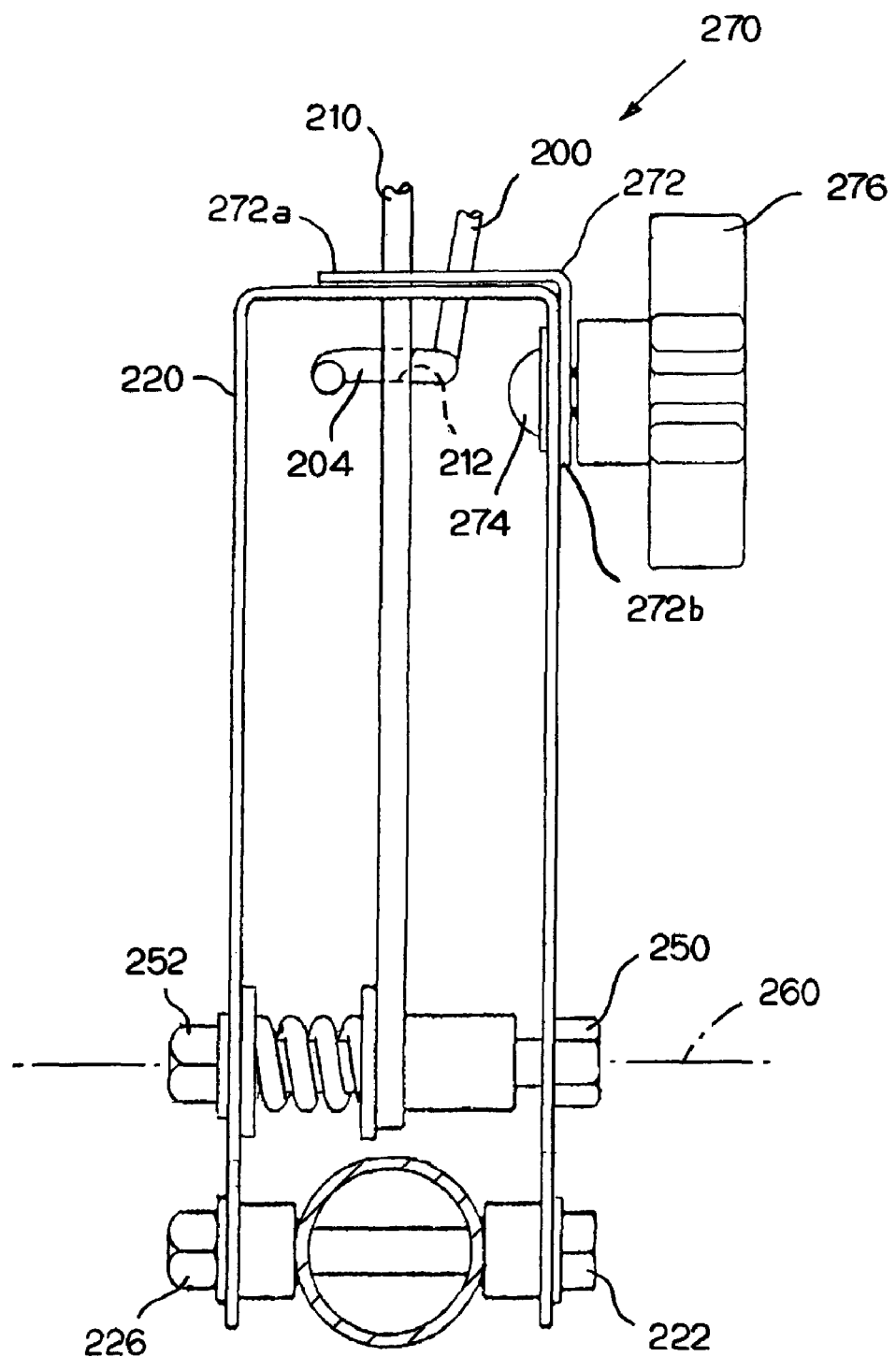
FIG. 6A is an end view taken along line 6A-6A of FIG. 6, illustrating the enclosure for the control handle.
Figure 6B:
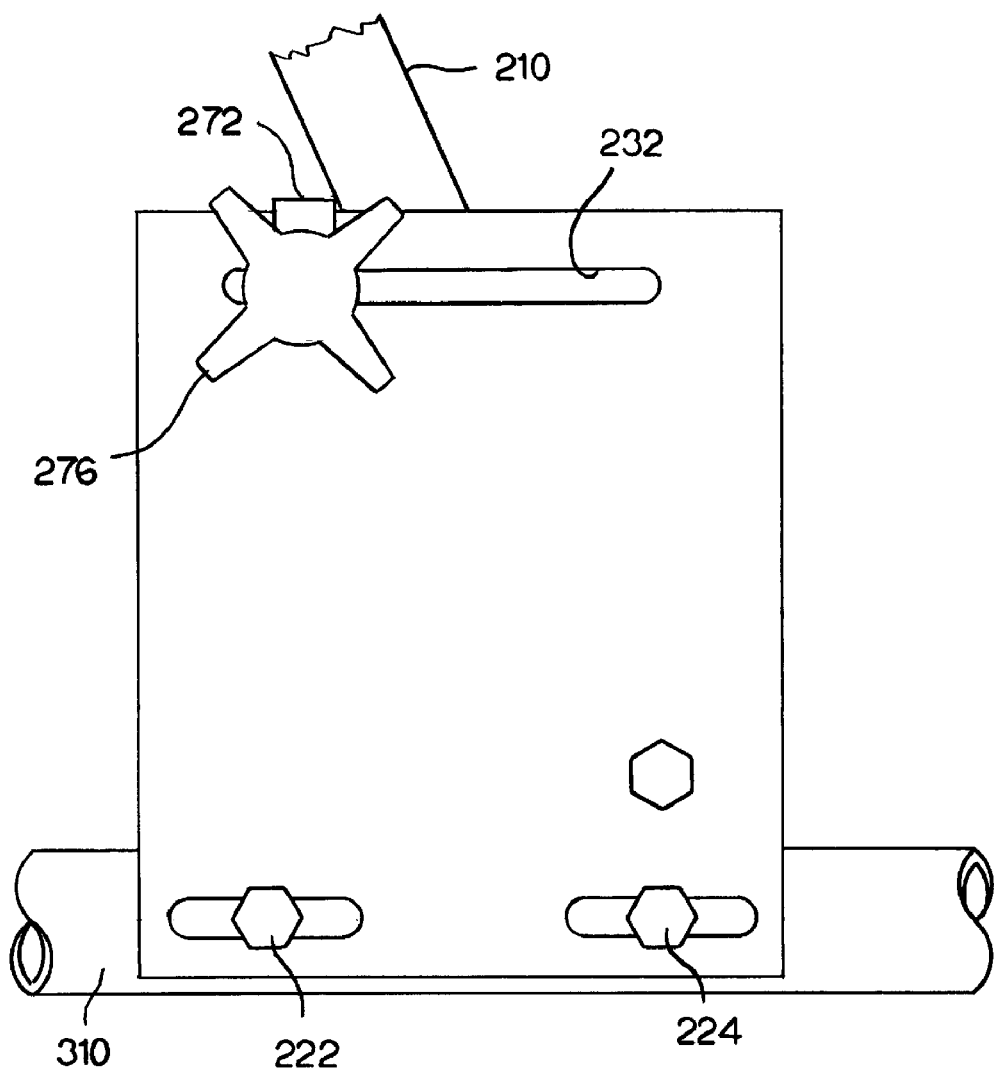
FIG. 6B is a side view taken along line 6B-6B of FIG. 6, illustrating the enclosure for the control handle.

In order to control and limit the movement of the control handle 210, a slot 230 is defined through the upper surface of the enclosure 220. As the control handle 210 is rotated forward or rearward about the pivot axis 260, the movement of the control handle 210 is mechanically limited by the slot 230. Furthermore, in this exemplary embodiment and as best shown in FIG. 6A, a calibration assembly 270 is provided to alter the length of the slot 230 to further limit movement of the control handle 210. Specifically, the calibration assembly 270 includes a stop plate 272, having a first leg 272a that fits over and abuts the upper surface of the enclosure 220 and a second leg 272b that abuts the side surface of the enclosure 220. Since the first leg 272a is positioned over the slot 230, it effectively defines one distal end of the slot 230.

There is also a second slot 232 defined through the side surface of the enclosure 220. The calibration assembly 270 further includes a bolt 274 that passes through the second leg 272b of the stop plate 272 and through this second slot 232 defined through the side surface of the enclosure 220. Finally, the calibration assembly 270 includes an adjustment knob 276 secured to the distal end of the bolt 274. Thus, when the adjustment knob 276 has been loosened relative to the bolt 274, the adjustment knob 276, along with the stop plate 272, can be moved along the length of the slot 232 defined through the side surface of the enclosure 220. As the stop plate 272 moves, the first leg 272a of the stop plate 272 effectively alters the length of the slot 230 to control movement of the control handle 210.

Through use of such a calibration assembly 270, the position of the stop plate 272 can be adjusted to verify the closed position of the second plate 70 and to appropriately define the fully open position of the second plate 70. In short, when the broadcast spreader is assembled, the control handle 210 is pushed rearward to the position shown in FIG. 8, to make sure that the second plate 70 effectively closes the pathway for the granular material from the hopper 12 through the discharge port 13 and onto the rotating fan 30. Then, the control handle 210 can be pushed forward, rotating about the pivot axis 260 until the rear opening 80 defined by the second plate 70 is in registry with the discharge port 13 defined by the hopper 12. Once the appropriate position of the control handle 210 has been established, the stop plate 272 can be moved to establish this "stop" position, thus marking the fully open position.

Of course, rather than the linking rod 200 described above, various other forms of cables, actuators, solenoids, etc. could be used to effectuate the movement of the second plate 70 (and/or the first plate 50) without departing from the spirit and scope of the present invention.

One of ordinary skill in the art will also recognize that additional embodiments and configurations are also possible without departing from the teachings of the present invention or the scope of the claims which follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A broadcast spreader, comprising:
    a hopper adapted to store granular material and including a discharge port through a surface thereof;
    a fan rotating about an axis for distributing the granular material passing from the hopper through the discharge port;
    a first plate that is secured to and adapted for slidable movement with respect to the hopper, the first plate defining an opening therethrough that is substantially in registry with but smaller than the discharge port, thus serving to define a pathway for the granular material from the hopper through the discharge port and onto the fan, wherein movement of the first plate relative to the hopper causes a shifting of the pathway for the granular material; and
    a second plate secured to and adapted for slidable movement with respect to the hopper and the first plate, wherein the second plate is in a stacked relationship with respect to the first plate, wherein movement of the second plate is independent of movement of the first plate, wherein movement of the second plate relative to the first plate selectively opens or closes the pathway for the granular material from the hopper through the discharge port and onto the fan, and wherein the first plate moves in a first direction, and the second plate moves in a second direction that is substantially perpendicular to the first direction;
    wherein said first plate defines first and second longitudinal slots along one edge, and further defines third and fourth longitudinal slots along an opposite edge.

2. The broadcast spreader as recited in claim 1, wherein said second plate defines a first longitudinal slot along one edge and a second longitudinal slot along an opposite edge, wherein the longitudinal slots defined by said second plate are oriented substantially perpendicular to the longitudinal slots defined by said first plate.

3. The broadcast spreader as recited in claim 2, and further comprising a pair of braces, each brace including a base member with a boss extending upwardly from the base member at each distal end thereof, wherein said bosses extend into and are received in the longitudinal slots defined by said second plate and the longitudinal slots defined by said first plate, such that said bosses allow for movement of said first plate relative to the braces and the hopper, but limit this movement to the first direction, and wherein said bosses further allow for movement of said second plate relative to the braces and the hopper, but limit this movement to the second direction.

4. The broadcast spreader as recited in claim 1, and further comprising:
   a control handle; and
   a linking rod operably connecting said control handle to said second plate, such that manipulation of said control handle effectuates the sliding movement of the second plate with respect to said first plate to regulate flow of the granular material from the hopper, through the discharge port and the opening defined through the first plate, and onto the fan.

5. The broadcast spreader as recited in claim 4, wherein said second plate defines a hole near its front edge, with a distal end of the linking rod being inserted into and secured to the hole to operably connect the linking rod to said second plate.

6. The broadcast spreader as recited in claim 5, wherein said control handle defines a hole, with an opposite end of the linking rod being inserted into and secured in the hole to operably connect the linking rod to said control handle.

7. The broadcast spreader as recited in claim 4, wherein a bolt passes through said control handle, said bolt defining a pivot axis such that said control handle can be rotated forward or rearward about the pivot axis.

8. The broadcast spreader as recited in claim 7, and further comprising an enclosure for housing a lower portion of said control handle.

9. The broadcast spreader as recited in claim 8, wherein a slot having a predetermined length is defined through an upper surface of said enclosure, limiting forward and rearward rotation of said control handle about the pivot axis.

10. The broadcast spreader as recited in claim 9, and further comprising a calibration assembly to alter the length of the slot defined through the upper surface of said enclosure, said calibration assembly including:
   a stop plate, having a first leg that fits over and abuts the upper surface of said enclosure and a second leg that abuts a side surface of said enclosure;
   a second bolt passing through the second leg of the stop plate and through a second slot defined through the side surface of said enclosure; and
   an adjustment knob is secured to a distal end of the second bolt, such that when the adjustment knob has been loosened relative to the second bolt, the adjustment knob, along with the stop plate, can be moved along the length of the slot defined through the side surface of said enclosure, with the first leg of the stop plate effectively altering the length of the slot defined through the upper surface of said enclosure to control movement of said control handle.

11. A broadcast spreader, comprising:
   a hopper adapted to store granular material and including a discharge port through a surface thereof;
   a fan rotating about an axis for distributing the granular material passing from the hopper through the discharge port;
   a first plate that is secured to and adapted for slidable movement with respect to the hopper, the first plate defining an opening therethrough that is substantially in registry with but smaller than the discharge port, thus serving to define a pathway for the granular material from the hopper through the discharge port and onto the fan, wherein movement of the first plate relative to the hopper causes a shifting of the pathway for the granular material; and
   a second plate secured to and adapted for slidable movement with respect to the hopper and the first plate, wherein the second plate is in a stacked relationship with respect to the first plate, wherein movement of the second plate is independent of movement of the first plate, wherein movement of the second plate relative to the first plate selectively opens or closes the pathway for the granular material from the hopper through the discharge port and onto the fan, and wherein the first plate moves in a first direction, and the second plate moves in a second direction that is substantially perpendicular to the first direction;
   wherein said second plate has a generally C-shape with a rear opening, such that, in an open position, the rear opening is in registry with the discharge port defined by the hopper and the opening defined by said first plate to allow for the passage of the granular material from the hopper, through the discharge port and the opening defined through said first plate, through the rear opening defined by said second plate, and onto the fan.

12. The broadcast spreader as recited in claim 11, and further comprising:
   a control handle; and
   a linking rod operably connecting said control handle to said second plate, such that manipulation of said control handle effectuates the sliding movement of the second plate with respect to said first plate to regulate flow of the granular material from the hopper, through the discharge port and the opening defined through the first plate, and onto the fan.

13. The broadcast spreader as recited in claim 12, wherein said second plate defines a hole near its front edge, with a distal end of the linking rod being inserted into and secured to the hole to operably connect the linking rod to said second plate.

14. A broadcast spreader, comprising:
   a hopper adapted to store granular material and including a discharge port through a surface thereof;
   a fan rotating about an axis for distributing the granular material passing from the hopper through the discharge port in a predetermined distribution pattern; and
   a directional control assembly, including
      a first plate that is secured to and adapted for slidable movement with respect to the hopper, the first plate defining an opening therethrough that is substantially in registry with but smaller than the discharge port, thus serving to define a pathway for the granular material from the hopper through the discharge port and onto the fan, wherein movement of the first plate relative to the hopper causes a shifting of the pathway for the granular material, thus altering the direction of the predetermined distribution pattern, and
      a second plate secured to and adapted for slidable movement with respect to the hopper and the first plate, wherein the second plate is in a stacked relationship with respect to the first plate, wherein movement of the second plate is independent of movement of the first plate, wherein movement of the second plate relative to the first plate selectively opens or closes the pathway for the granular material from the hopper through the discharge port and onto the fan, wherein the first plate moves in a first direction, and the second plate moves in a second direction that is substantially perpendicular to the first direction;

wherein said first plate defines first and second longitudinal slots along one edge, and further defines third and fourth longitudinal slots along an opposite edge.

15. The broadcast spreader as recited in claim 14, wherein said second plate defines a first longitudinal slot along one edge and a second longitudinal slot along an opposite edge, wherein the longitudinal slots defined by said second plate are oriented substantially perpendicular to the longitudinal slots defined by said first plate.

16. The broadcast spreader as recited in claim 15, and further comprising a pair of braces, each brace including a base member with a boss extending upwardly from the base member at each distal end thereof, wherein said bosses extend into and are received in the longitudinal slots defined by said second plate and the longitudinal slots defined by said first plate, such that said bosses allow for movement of said first plate relative to the braces and the hopper, but limit this movement to the first direction, and wherein said bosses further allow for movement of said second plate relative to the braces and the hopper, but limit this movement to the second direction.

17. The broadcast spreader as recited in claim 14, and further comprising:
 a control handle; and
 a linking rod operably connecting said control handle to said second plate, such that manipulation of said control handle effectuates the sliding movement of the second plate with respect to said first plate to regulate flow of the granular material from the hopper, through the discharge port and the opening defined through said first plate, and onto the fan.

18. A broadcast spreader, comprising:
 a hopper adapted to store granular material and including a discharge port through a surface thereof;
 a fan rotating about an axis for distributing the granular material passing from the hopper through the discharge port in a predetermined distribution pattern; and
 a directional control assembly, including
  a first plate that is secured to and adapted for slidable movement with respect to the hopper, the first plate defining an opening therethrough that is substantially in registry with but smaller than the discharge port, thus serving to define a pathway for the granular material from the hopper through the discharge port and onto the fan, wherein movement of the first plate relative to the hopper causes a shifting of the pathway for the granular material, thus altering the direction of the predetermined distribution pattern, and
  a second plate secured to and adapted for slidable movement with respect to the hopper and the first plate, wherein the second plate is in a stacked relationship with respect to the first plate, wherein movement of the second plate is independent of movement of the first plate, wherein movement of the second plate relative to the first plate selectively opens or closes the pathway for the granular material from the hopper through the discharge port and onto the fan, wherein the first plate moves in a first direction, and the second plate moves in a second direction that is substantially perpendicular to the first direction;
  wherein said second plate has a generally C-shape with a rear opening, such that, in an open position, the rear opening is in registry with the discharge port defined by the hopper and the opening defined by said first plate to allow for the passage of the granular material from the hopper, through the discharge port and the opening defined through the first plate, through the rear opening defined by said second plate, and onto the fan.

19. A broadcast spreader, comprising:
 a hopper adapted to store granular material and including a discharge port through a surface thereof;
 a fan rotating about an axis for distributing the granular material passing from the hopper through the discharge port;
 a first plate that is secured to and adapted for slidable movement with respect to the hopper, the first plate defining an opening therethrough that is substantially in registry with but smaller than the discharge port, thus serving to define a pathway for the granular material from the hopper through the discharge port and onto the fan, wherein movement of the first plate relative to the hopper causes a shifting of the pathway for the granular material; and
 a second plate secured to and adapted for slidable movement with respect to the first plate, wherein movement of the second plate relative to the first plate selectively opens or closes the pathway for the granular material from the hopper through the discharge port and onto the fan;
 wherein said first plate moves in a first direction, and said second plate moves in a second direction that is substantially perpendicular to the first direction; and
 wherein said first plate defines first and second longitudinal slots along one edge, and further defines third and fourth longitudinal slots along an opposite edge.

20. The broadcast spreader as recited in claim 19, wherein said second plate defines a first longitudinal slot along one edge and a second longitudinal slot along an opposite edge, wherein the longitudinal slots defined by said second plate are oriented substantially perpendicular to the longitudinal slots defined by said first plate.

21. The broadcast spreader as recited in claim 20, and further comprising a pair of braces, each brace including a base member with a boss extending upwardly from the base member at each distal end thereof, wherein said bosses extend into and are received in the longitudinal slots defined by said second plate and the longitudinal slots defined by said first plate, such that said bosses allow for movement of said first plate relative to the braces and the hopper, but limit this movement to the first direction, and wherein said bosses further allow for movement of said second plate relative to the braces and the hopper, but limit this movement to the second direction.

\* \* \* \* \*